Figure 1:
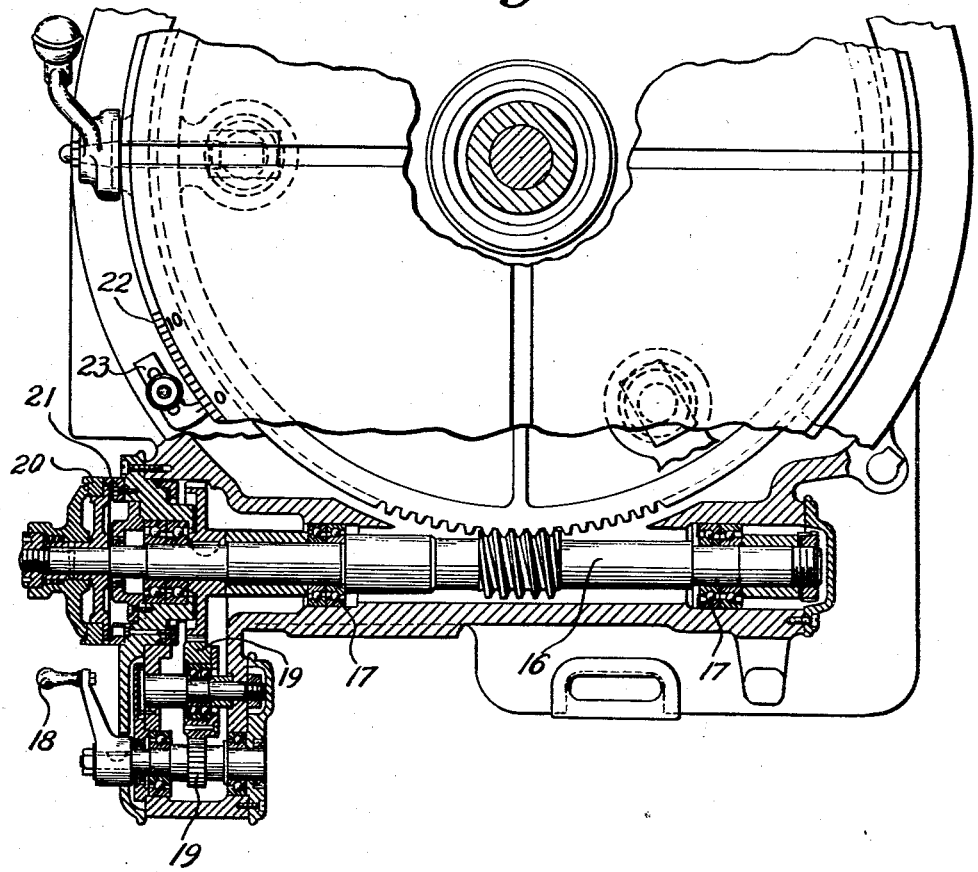

Oct. 24, 1939.   J. M. RUSNAK   2,177,006

ROTARY TABLE FOR MACHINE TOOLS

Filed July 22, 1938

INVENTOR
J. M. Rusnak
BY Joseph M. Schofield
ATTORNEY

Patented Oct. 24, 1939

2,177,006

UNITED STATES PATENT OFFICE 2,177,006

ROTARY TABLE FOR MACHINE TOOLS

John M. Rusnak, West Hartford, Conn., assignor to Niles-Bement-Pond Company, Hartford, Conn., a corporation of New Jersey Application July 22, 1938, Serial No. 220,774

2 Claims. (Cl. 90—58)

This invention relates to rotary work supporting tables for machine tools such as vertical milling machines, vertical boring machines, etc.

An object of the present invention is to provide an improved form of table upon which work pieces may be mounted and rotated angularly about an axis through any predetermined angles.

A feature of importance of the present invention is that a worm wheel is mounted on or formed as a part of the rotating table which intermeshes with a worm upon a shaft, the axis of rotation of which is fixed, the work table being adjustable toward and from the worm to eliminate any lost motion between the intermeshing teeth of the worm and worm wheel and enabling adjustments to be made in the event of there being any appreciable wear of the worm or worm wheel.

Another feature which is advantageous is that the rotary table rests upon and may be clamped to a plane surface formed on the supporting member for the table, there being manual means to clamp the table in any adjusted angular position.

Another feature of the invention which enables me to accomplish the above named objects is that the work table is mounted for rotation upon a vertical axis, there preferably being provided one or more anti-friction bearings engaging a central pin formed on the table, the bearings being mounted within an eccentric sleeve fitting within a central opening of the support so that by angularly adjusting the sleeve the table with the worm wheel can be adjusted laterally to properly intermesh the worm with the teeth of the worm wheel.

With the above and other objects in view, the invention may include the features of construction and operation set forth in the following specification and illustrated in the accompanying drawing.

In the accompanying drawing annexed hereto and forming a part of this specification, I have shown the invention embodied in a work rotating table for a vertical boring machine, but it will be understood that the invention can be otherwise embodied and that the drawing is not to be construed as defining or limiting the scope of the invention, the claims appended to this specification being relied upon for that purpose.

Figure 2:
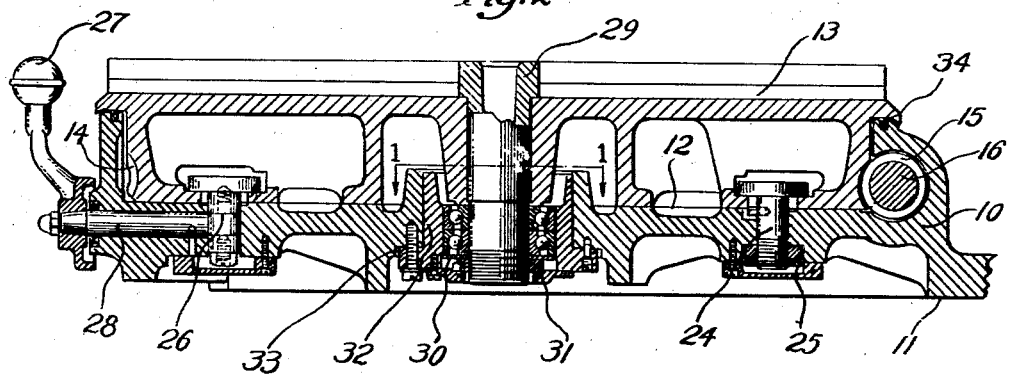

In the drawing:

Figure 1 is a plan view of the major portion of a rotatable work table, parts being broken away to more clearly illustrate its rotating means and pivotal supporting bearing, and Fig. 2 is a sectional view upon planes taken through parts of the table and showing the central pivotal mounting and means to clamp the table in predetermined angular positions.

In the above mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a supporting member adapted to be secured in any preferred manner (not shown) to the work support of a machine tool, there being a flat supporting surface preferably parallel to the surface of the support engaging the machine tool; second, a shaft having a worm upon its central portion and mounted for rotation upon a fixed axis, there being rotating means at one end and a graduated dial thereon to determine the rotative movement of the worm; third, a table closely engaging and rotatable upon the flat surface on the supporting member, there being a worm wheel preferably formed upon the periphery of the table and there being T-slots in the upper or work engaging surface of the table; fourth, one or more adjustable clamps or hold-down members mounted within the support and having head portions thereon closely engaging portions of the work table; fifth, a manually operated clamping means mounted in the supporting member and having a handle for clamping and unclamping this member whenever desired; sixth, a central pivot mounted within the table and having anti-friction bearings mounted upon its lowermost portion; and seventh, and eccentric sleeve fitting the outer races of the anti-friction bearings and being mounted for adjustment angularly within the supporting member.

Referring more in detail to the figures of the drawing, I provide a supporting member 10 having a plane base surface 11 adapting it for attachment directly to the work carriage of a machine tool. This support 10 is also provided with a plain surface 12 parallel to its lowermost or base surface and forming the bearing surface for the angularly adjustable table member 13. The table 13, as shown, is provided with gear teeth 14 extending about its periphery adapted to engage with the teeth of a worm 15 on a transverse shaft 16 rotatably mounted as upon anti-friction bearings 17 upon a fixed axis. It will be seen from the above that rotation of the worm 15, as by means of the handle 18 operating through a short train of gears 19, will rotate the table 13 to any angular position, means being provided to maintain the worm 15 and its shaft 16 against axial movement.

Upon the forward end of the worm shaft 16 may be mounted a dial 20 adapted to be clamped to the worm shaft 16 in any angular position and be rotated with the worm shaft 16 adjacent a zero line (not shown) formed on a fixed member 21 secured to or forming a part of the support 10. By these means the table 13 may be rotated to any predetermined or desired precise position. Also there may be provided a graduated circle 22 upon the periphery of the table 13 contacting with a zero line upon an adjustable member 23 on the support adjacent thereto. By these means the angular position and adjustment of the table can be determined and effected.

In order to hold the table 13 closely in contact with its support 10, bolts 24 may be inserted extending through the supporting member 10 and having their headed ends in engagement with a portion of the table 13. By means of nuts 25 on the lower threaded ends of these clamping bolts or screws 24, the table 13 may be adjusted so that it will be maintained closely in contact with its supporting member 10 but will be free to rotate thereon. Several of these headed screws 24 may be provided spaced about the table, but one of which is shown. Another clamping member 26 may be provided which may be adapted to be moved into and from clamping position by means of a hand lever 27 on the forward end of a radially mounted shaft 28. This shaft 28 has an eccentric at its inner end bearing against a shoulder in the bottom of a slot or hole within the screw or bolt 26.

In order to support the table for rotation about a vertical axis, a central pivot or stud 29 may be mounted in the table 13, its lower end being provided with one or more anti-friction bearings 30 held in place against a shoulder on the table by suitable nuts 31 threaded upon the lower end of this pivot 29. The anti-friction bearings 30 have their outer races engaging the inner cylindrical wall of an eccentric sleeve 32. The outer cylindrical surface of this sleeve 32, which is not coaxial with the axis of its inner cylindrical surface, closely fits the vertical cylindrical surface of a central vertical opening in the supporting member 10. By means of this eccentric sleeve 32 the eccentricity of which will be obvious in Fig. 1 of the drawing, the axis about which the table 13 rotates may be adjusted toward and from the worm 15 so that the teeth of the worm wheel 14 on the table 13 will closely intermesh and contact with the gear teeth of the worm.

In order to retain the eccentric sleeve 32 in angular position after it has been angularly adjusted to eliminate any lost motion between the teeth of the worm 15 and worm wheel 14, sleeve 32 may be locked in angular position by means of a screw 33 passing through an opening or slot within the sleeve 32 and threaded within the support 10.

To exclude dust and dirt from the operative parts of the rotating means for the table 13 an outwardly extending flange 34 is formed on the table 13 extending over the upper wall of the support 10. Between the flange 34 and the wall of the support 10 a compressible packing of leather or rubber 35 may be inserted, entering, as shown in Fig. 2, a circular channel provided therefor in the support 10.

What I claim is:

1. A rotary work supporting table for machine tools comprising in combination, a body member having a plane bearing surface, a table mounted for rotation thereon while maintained in contact with said surface, worm and worm wheel means to rotate said table, a central stud on said table, a rotary bearing in said body member for said stud, an eccentric sleeve disposed between said bearing and body member, means to adjust the rotary position of said sleeve to vary the position of said table toward and from said worm, means to lock said sleeve in adjusted position, and clamping means for securing said table to said body member against said plane bearing surface in any adjusted position.

2. A rotary work supporting table for machine tools comprising in combination, a body member having a plane bearing surface, a table mounted for rotation thereon while maintained in contact with said surface, worm and worm wheel means to rotate said table, a central stud on said table, an anti-friction bearing mounted on said stud, an eccentric sleeve disposed within said body member engaging said anti-friction bearing upon its inner annular surface, means to adjust the rotary position of said sleeve to vary the position of said table toward and from said worm, means to lock said sleeve in adjusted position, and clamping means for securing said table to said body member against said plane bearing surface in any adjusted position.

JOHN M. RUSNAK.